(12) United States Patent
Tevis et al.

(10) Patent No.: US 12,338,606 B2
(45) Date of Patent: Jun. 24, 2025

(54) INCHING SYSTEMS AND METHODS

(71) Applicant: Caterpillar Inc., Peoria, IL (US)

(72) Inventors: Ethan M. Tevis, Bloomington, IL (US); Jaspen T. Patenaude, Princeville, IL (US); Joseph R. Manley, Bixby, OK (US)

(73) Assignee: Caterpillar Inc., Peoria, IL (US)

( * ) Notice: Subject to any disclaimer, the term of this patent is extended or adjusted under 35 U.S.C. 154(b) by 678 days.

(21) Appl. No.: 17/465,073

(22) Filed: Sep. 2, 2021

(65) Prior Publication Data
US 2023/0068612 A1 Mar. 2, 2023

(51) Int. Cl.
*E02F 9/20* (2006.01)
*E02F 9/22* (2006.01)
*E02F 3/76* (2006.01)

(52) U.S. Cl.
CPC ............ *E02F 9/2079* (2013.01); *E02F 9/202* (2013.01); *E02F 9/2253* (2013.01); *E02F 3/7636* (2013.01)

(58) Field of Classification Search
CPC ....... E02F 9/2079; E02F 9/202; E02F 9/2253; E02F 3/7636; F16H 61/0202; F16H 2312/10; B60Y 2200/411
See application file for complete search history.

(56) References Cited

U.S. PATENT DOCUMENTS

| | | | | |
|---|---|---|---|---|
| 3,923,076 A * | 12/1975 | Blake | ................. | F16H 61/0272 137/594 |
| 4,790,420 A | 12/1988 | Hata et al. | | |
| 5,040,648 A * | 8/1991 | Mitchell | ............... | B60W 10/18 477/65 |
| 5,050,456 A * | 9/1991 | Fukuda | ............... | F16H 59/0204 477/115 |
| 5,083,647 A * | 1/1992 | Bulgrien | ............... | F16H 61/061 701/67 |
| 5,101,943 A * | 4/1992 | Bulgrien | ......... | B60W 30/18063 701/67 |
| 5,107,435 A * | 4/1992 | Yamada | ............... | G05B 19/409 408/11 |
| 5,520,593 A * | 5/1996 | Yesel | ............. | B60W 30/18063 477/79 |

(Continued)

FOREIGN PATENT DOCUMENTS

| | | | | |
|---|---|---|---|---|
| CN | 103561986 A * | 2/2014 | ............. | B60D 1/245 |
| DE | 102014212189 A1 * | 1/2015 | ............. | F16D 48/02 |
| EP | 2949971 A1 | 12/2015 | | |

*Primary Examiner* — Steven B Theriault
(74) *Attorney, Agent, or Firm* — Leydig, Voit & Mayer, Ltd

(57) ABSTRACT

A method of operating a machine with at least one hydraulically actuated friction clutch. The method includes selecting, via a mode selector, a starting point defining an initial setting. An endpoint defining a peak setting is selected via the mode selector. A control curve is employed based on at least the selecting of the starting point and the selecting of the endpoint. An inching pedal of the machine is positioned to between 0 percent depressed and 100 percent depressed. At least one control command is generated as a function of the employing of the control curve and the positioning of the inching pedal. At least one control valve of at least one hydraulically actuated friction clutch is operated according to the at least one control command.

18 Claims, 5 Drawing Sheets

(56) References Cited

U.S. PATENT DOCUMENTS

| | | | | |
|---|---|---|---|---|
| 5,553,517 | A * | 9/1996 | Yesel | B60K 17/356 74/731.1 |
| 5,717,433 | A * | 2/1998 | Doba | G06F 3/04886 345/173 |
| 5,848,952 | A * | 12/1998 | Hayward | F16H 61/0246 74/335 |
| 5,943,912 | A * | 8/1999 | Fowler | F16H 59/02 74/335 |
| 5,947,242 | A * | 9/1999 | Creger | F16H 61/143 192/3.3 |
| 6,536,408 | B1 * | 3/2003 | Warner | B60W 30/18136 303/142 |
| 6,565,482 | B2 * | 5/2003 | Kobayashi | B60W 30/1819 477/79 |
| 6,647,332 | B1 * | 11/2003 | Esterby | F16D 48/066 477/76 |
| 7,641,588 | B2 | 1/2010 | Thomson et al. | |
| 9,002,595 | B2 | 4/2015 | Davis et al. | |
| 10,451,124 | B2 * | 10/2019 | Bulgrien | F16D 48/06 |
| 11,685,374 | B2 * | 6/2023 | Negri | E02F 9/2253 192/220 |
| 2002/0019295 | A1 * | 2/2002 | Kobayashi | F16H 63/46 477/174 |
| 2003/0014172 | A1 * | 1/2003 | Burgart | F16H 61/0246 701/51 |
| 2004/0142794 | A1 * | 7/2004 | Henneken | F16H 59/0204 477/121 |
| 2005/0284719 | A1 * | 12/2005 | Kuhner | B60W 30/18063 192/3.51 |
| 2006/0191692 | A1 * | 8/2006 | Holt | A01B 67/00 172/2 |
| 2007/0137338 | A1 * | 6/2007 | Nishi | F16H 61/433 74/335 |
| 2008/0053738 | A1 * | 3/2008 | Kosuge | B62D 25/04 180/311 |
| 2009/0132134 | A1 * | 5/2009 | Chen | B60W 10/02 192/221 |
| 2009/0320462 | A1 * | 12/2009 | Ohtsukasa | F16H 61/472 60/431 |
| 2010/0054956 | A1 * | 3/2010 | Kitani | F02D 29/04 417/26 |
| 2010/0197459 | A1 * | 8/2010 | Yamaguchi | F16H 61/0246 477/176 |
| 2011/0218075 | A1 * | 9/2011 | Frank | B60W 30/18036 903/902 |
| 2012/0330524 | A1 * | 12/2012 | Rahman | B60W 30/18036 701/70 |
| 2014/0121911 | A1 * | 5/2014 | Davis | B60W 10/103 701/51 |
| 2014/0290236 | A1 * | 10/2014 | Aizawa | F16H 61/431 60/443 |
| 2015/0081191 | A1 * | 3/2015 | Kato | F02D 31/001 701/99 |
| 2015/0336609 | A1 * | 11/2015 | Smith | F16H 61/47 701/41 |
| 2016/0257539 | A1 * | 9/2016 | Kaneko | F02D 41/10 |
| 2016/0368141 | A1 * | 12/2016 | Touma | B25J 13/08 |
| 2017/0282874 | A1 * | 10/2017 | Alexander | B60T 7/085 |
| 2018/0119807 | A1 * | 5/2018 | Dannerbauer | B60W 10/101 |
| 2018/0172089 | A1 * | 6/2018 | Bulgrien | F16H 63/46 |
| 2018/0223918 | A1 * | 8/2018 | Bulgrien | F16H 61/684 |
| 2020/0003302 | A1 * | 1/2020 | Herrmann | F16H 61/425 |
| 2020/0318319 | A1 * | 10/2020 | Shimizu | F15B 21/082 |
| 2021/0078579 | A1 * | 3/2021 | Negri | B60W 10/103 |
| 2021/0222396 | A1 * | 7/2021 | Fukushima | E02F 3/7636 |

* cited by examiner

INCHING SYSTEMS AND METHODS

TECHNICAL FIELD

The present disclosure relates to inching control systems and the operation of machinery, such as heavy construction machinery, with inching controls.

BACKGROUND

The operation and use of machinery, such as heavy construction machinery having fluid operated power transmissions, typically include a provision for "inching" the vehicle. Inching the vehicle involves use of an inching pedal to send control signals that ultimately control the function of a hydraulically operated clutch of the vehicle. It is thereby possible, via manual operation of the inching pedal, to control the motion of the vehicle somewhat independently of the speed of the vehicle engine, which is desirable because the engine is also used to operate other systems of the vehicle, typically by generating fluid pressure used to actuate work-related components and systems to accomplish work tasks.

One challenge of configuring the operation of inching mechanisms and controls is that operators develop individual preferences for a particular feel or engagement profile of the inching pedal. The engagement profile is at least partly a function of an electronic control module responsible for defining parameters defining how the position of the inching pedal causes engagement and disengagement of the clutch of the machine and thus, movements of the machine. The materials being worked upon, the load with which the machine is engaged, and the operator preference all play a part in a demand to provide flexibility to operators regarding inching pedal feel and how modulation of the inching pedal is converted to efficient and controllable inching operation of the machine. The present disclosure addresses the demand.

U.S. Pat. No. 6,565,482 discusses a working vehicle which is provided with a characteristic change mechanism by which a flexibility of connection (slip condition) of the clutch mechanisms by the operation of the inching pedal can be selected in accordance with an operator's preference. This characteristic change mechanism is constituted by a switch for example and outputs a characteristic change signal to a controller.

The foregoing background discussion is intended solely to aid the reader. It is not intended to limit the innovations described herein, nor to limit or expand the prior art discussed. Thus, the foregoing discussion should not be taken to indicate that any particular element of a prior system is unsuitable for use with the innovations described herein, nor is it intended to indicate that any element is essential in implementing the innovations described herein. The implementations and application of the innovations described herein are defined by the appended claims.

SUMMARY

In one aspect, the disclosure includes a method of operating a machine with at least one hydraulically actuated friction clutch. The method includes selecting, via a mode selector, a starting point defining an initial setting. An endpoint defining a peak setting is selected via the mode selector. A control curve is employed based on at least the selecting of the starting point and the selecting of the endpoint. An inching pedal of the machine is positioned to between 0 percent depressed and 100 percent depressed. At least one control command is generated as a function of the employing of the control curve and the positioning of the inching pedal. At least one control valve of at least one hydraulically actuated friction clutch is operated according to the at least one control command.

In another aspect, the disclosure sets out a machine, including a frame and a power source mounted to the frame. A power source is mounted to the frame. A transmission is coupled to the power source, the transmission comprising at least one hydraulically actuated friction clutch and an inching control system. The inching control system includes a variable position inching pedal disposed on the frame. A sensor is configured to sense the position of the inching pedal and generate a position signal corresponding to the variable position of the inching pedal. A mode selector is mounted on the frame. An electronic control module is configured to receive the position signal from the sensor and inputs from the mode selector and configured to employ at least one control curve based on the inputs from the mode selector, wherein the inputs from the mode selector set endpoints of the control curve. The electronic control module is configured to generate control commands based on the position signal of the sensor and the generated control curve and configured to control the at least one hydraulically actuated friction clutch of the transmission via the control commands.

DETAILED DESCRIPTION

Figure 1:
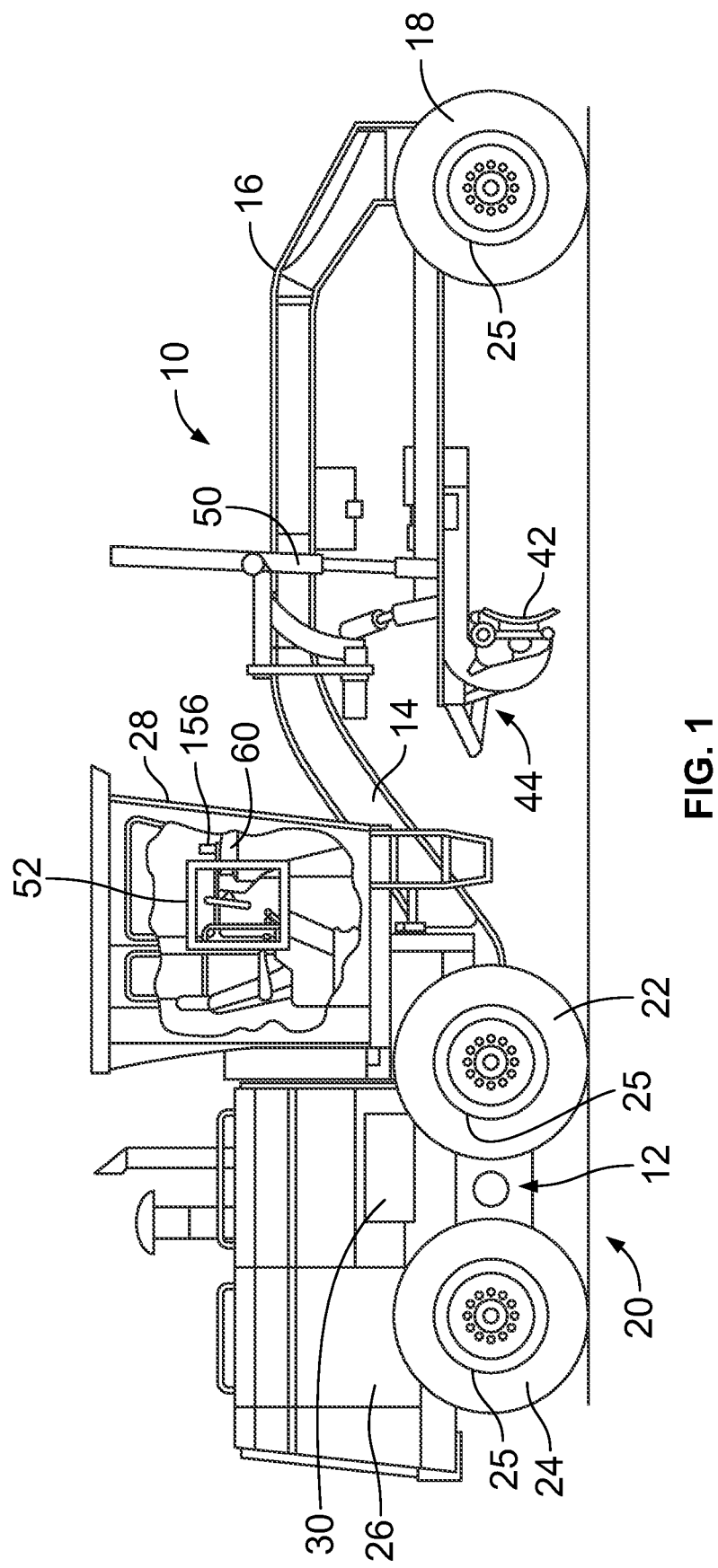
FIG. 1 is a side view of motor grader machine.

Now referring to the drawings, wherein like elements refer to like reference numbers, there is illustrated in FIG. 1 an exemplary embodiment of a machine 10 constructed according to principles of the present disclosure which includes a system for providing selectable inching control.

In the illustrated embodiment, the machine 10 is in the form of an exemplary work machine in which devices and methods according to the present disclosure and the present strategy may be implemented. FIG. 1 is a side view of a motor grader 10. It will be understood that the system of the present disclosure may be applied to any machine where it would be useful to provide operator-selectable inching control characteristics.

The motor grader 10 includes a chassis 12 from which forwardly extends a main frame 14. A forward end 16 of the main frame 14 is supported by front wheels 18. The chassis 12 may be supported by a tandem drive 20 including a first set of rear wheels 22 and a second set of rear wheels 24. In alternative embodiments, only a single set of rear wheel wheels may be provided. However, with a tandem drive system, all four rear wheels 22, 24 may be powered. The chassis 12 supports a power source 26, such as an internal combustion engine, and an operator cab 28 as one of ordinary skill in the art will readily understand. Brakes 25 may be associated with all or any of wheels 18, 22, and 24.

While the power source 26 may be an internal combustion engine, the power source may be a source of electricity, such as an electrical battery and the torque for operating the machine 10 may be generated by an electrical motor or a plurality of electrical motors. Furthermore, the machine 10 may be operated by hydraulic pumps or hydraulic motors or electrical traction motors, for example. In such alternative embodiments, commands for operating the machine 10 may be configured to contemplate these and other power sources 26 and associated operating mechanisms of the machine powered by the power source to operate the machine according to the disclosure.

Each of the wheels 22, 24 may be powered by an automatic transmission 30 operatively connected between the power source 26 and the wheels 22, 24, as is well known. A rotating power source output shaft (not shown) extending from the power source 26 is connected to a transmission input shaft (not shown) directly, by a torque converter, or by another indirect connection known in the art. A transmission output shaft (not shown) is then connected to the wheels 22, 24 by way of a final drive (not shown) or the like. As is typical and known in the art, the transmission 30 may have a series of gears (not shown) that are selectively engaged by a combination of clutches, for example hydraulically actuated clutches, to produce desired downstream gear ratios.

Attached to the main frame 14 may be a tool or implement 42 in the form of a work blade. The work blade 42 may be mounted on a drawbar-circle moldboard assembly (DCM) 44 comprising a drawbar connected to a circle as is known. The DCM is operated to provide rotation of the work blade 42 into a variety of angular settings and other positional adjustments relative to the frame for engaging work material as desired. Hydraulic cylinders 50 may also be provided to raise and lower the DCM 44 and blade 42 as a whole. In other embodiments, different mechanical or hydraulic arrangements can be provided to allow for rotation of the work blade 42, while in still other embodiments, specialized tools other than the work blade 42, or in addition to the work blade 42 may be mounted on the DCM 44 or otherwise under the main frame 14, at the forward end 16, opposite the forward end of the machine 10, and in any desired combination. The varying arrangements of and selection of implements 42 attached to the main frame 14, the materials being worked upon, and the desired end result may affect the weight and loading of the motor grader 10 and require adjustments by the operator to ensure that work tasks being conducted are being performed efficiently and effectively.

Figure 2:
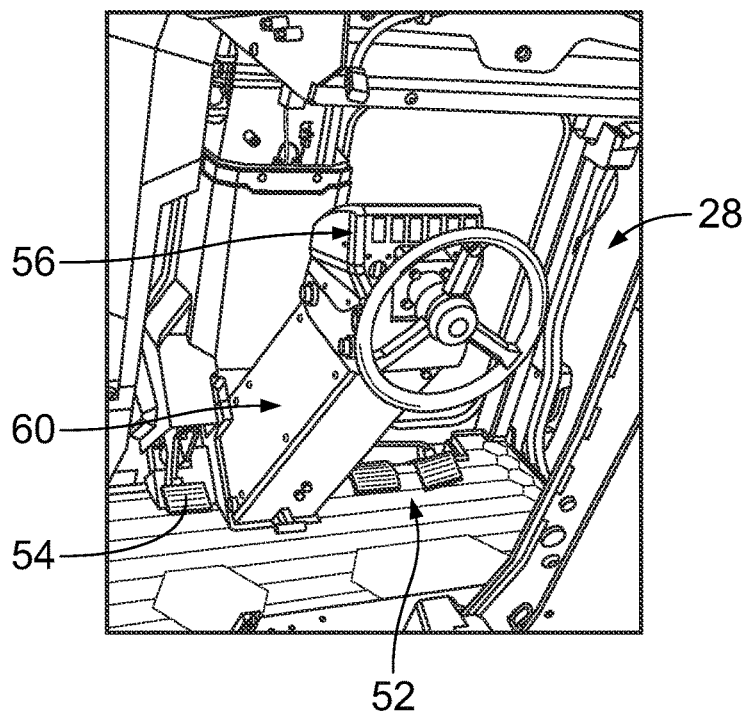
FIG. 2 is an operator compartment of the machine.

The operator cab 28 includes standard operator controls 52 for steering, gear selection, implement adjustment, engine throttle, and braking, as well as gauges and other types of indictors to monitor various operational parameters of the machine 10, such as fluid pressure and temperature, speed, and so on. In particular, and referring also to FIG. 2, an inching pedal 54 is provided for inching control of the machine 10. It will be appreciated that the pedal 54 may be any control input device provided in any suitable configuration by the use of which a machine operator may control inching of the machine. For purposes of the present disclosure, any such controller will be referred to herein as a pedal due to the common implementation of inching controls in such a configuration.

In addition, a mode selector 56 is located in the operator cab 28 to provide a means for the operator to select at least one of a number of alternative inching control characteristics as will be explained in detail below. The mode selector 56 may be buttons, icons on a touch screen, switches, or any suitable means of selecting one or more inching control characteristic or mode.

The mode selector 56 is part of an inching control system 100 including an electronic control module (ECM) 60 that is configured to convert inching pedal 54 position to an inching position signal and configured to generate and output a control command, responsive to operator inputs input via the mode selector. Briefly, the inching control characteristic referred to in the present disclosure is a selectable relationship between the position of the inching pedal 54 and at least one output signal or command generated by the electronic control module (ECM) 60 that controls operation of clutches of the vehicle transmission and ultimately results in rim pull of the machine. The electronic control module 60 of this disclosure may be of any conventional design having hardware and software configured to receive signals, perform calculations, and send commands to adapt inching performance of the machine 10 to user preferences.

The electronic control module or ECM 60 may include one or more microprocessors 71, a memory 73, a data storage device, a communications hub, and/or other components known in the art. It is contemplated that the ECM 60 may be further configured to receive additional inputs (not shown) indicative of various operating parameters of the machine 10 and/or additional components, such as, for example, from temperature sensors, position sensors, for monitoring any desirable parameter as is known in the art. It is also contemplated that the ECM 60 may be preprogrammed with functions relating to operation of the machine 10.

It is also contemplated that the ECM 60 may receive and deliver signals via one or more communication lines as is conventional in the art. Communication lines for conveying communications from inputs including sensors, to the ECM 60, between elements of the ECM, and commands from the ECM including output signals, include coaxial cables, copper wire and fiber optics, and can also take the form of acoustic or light waves, such as those generated during radio-wave and infra-red data communications. It is further contemplated that the received and delivered signals/commands may be any known signal format, such as, for example, a current or a voltage level, or digital formats.

The ECM 60 may be part of a machine controller that is configured to execute specified programs that control and monitor various functions associated with the work machine 10, including functions that are outside the scope of the present disclosure, and including those configured to control engine, emissions, and brake systems, and perform geolocation, data acquisition, communications, and other functions. Alternatively, the ECM 60 may be a control module separate from other electronic controllers for operating the machine that is configured only to produce inching control characteristics according to the present disclosure.

Figure 3:
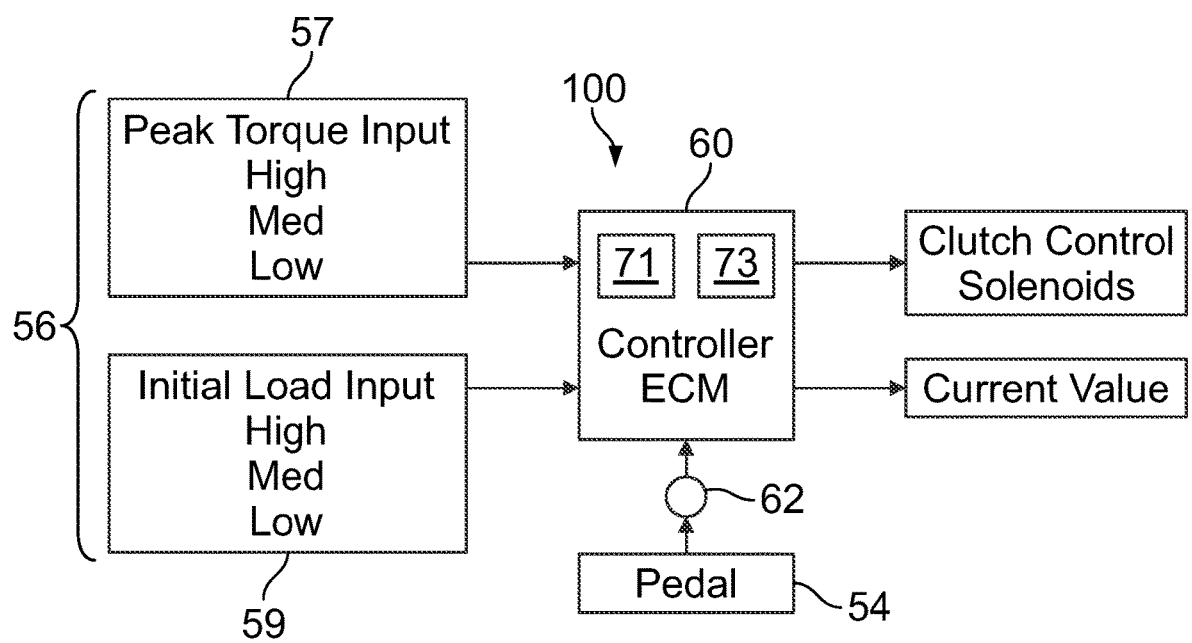
FIG. 3 is a simplified schematic of an inching control system according to an embodiment of the disclosure.

FIG. 3 illustrates a generalized representation of a selectable inching control system 100 according to one embodiment of the disclosure. The system 100 includes an inching pedal 54 mounted on the machine 10 (See also FIGS. 1 and 2) so as to be accessible to an operator of the machine and a mode selector 56. The pedal 54 may be in the form of a movable platform like that of a brake pedal or throttle pedal as is known. Position of the pedal 54 is sensed by a position sensor 62, which may a linear, rotary, or any other suitable position sensor device. The position sensor 62 is in communication with the ECM 60. The ECM 60 receives inputs from the position sensor corresponding to the position of the pedal 54 and generates one or more output(s) including control commands that controls the state of one or more clutch(es) of the transmission 30. In an alternative embodiment, the control commands may be employed to operate the brakes 25 of the machine 10 to modify the speed of the machine in operation.

Position of the inching pedal 54 produces, via the sensor 62, a signal which may be proportional to the position of the pedal, which in one embodiment, may be represented as a percentage where 100% is a fully depressed pedal and 0% is a fully extended pedal. The inching pedal 54 may alternatively produce a hydraulic pilot pressure which may be sensed and proportional signals generated thereby. It will be understood that in operation, when the inching pedal 54 is 100% depressed, a clutch or clutches of the machine transmission 30 are caused to be decoupled and the power source 26 (FIG. 1) is rendered unable to propel the machine. When the inching pedal is 0% depressed, the clutch or clutches of the machine transmission 30 are caused to be fully coupled and the machine 10 is permitted to be propelled.

The mode selector 56, in one embodiment, has two sets of selections available to the operator. A first set of selections 57 defines different endpoints of the clutch peak torque input and a second set of selections 59 defines different endpoints of the initial load input. The values of each of first and second selections 57, 59 may be referred to as "High, Medium, and Low." The selections represent relative amounts of gain generated by the ECM 60. The generated gain may be considered ECM control or command signals. Selecting one of the selections of both the first set 57 and the second set 59 defines an inching control characteristic in the form of a control curve, which may be linear, segmented, or polynomial curves, and, depending on the position signal from the sensor 62 of the inching pedal 54, the resulting point on the curve determines the command that is output to current drivers for controlling fluid flow to at least one of the clutches of the transmission 30. A linear curve will have a constant slope. A non-linear curve may have a constantly changing rate of curvature. A segmented curve may be two or more segments, each segment having a different slope. A polynomial curve may have a shape defined by a polynomial function.

It will be understood that the clutch peak torque input corresponds to a maximum output command and results in the greatest amount of clutch engagement. The initial load input corresponds to the smallest output command and results in an initial engagement of one or more of the clutches. In other words, peak torque input is an endpoint of the selected control characteristic resulting in the maximum rim pull generated via full engagement of the transmission clutch(es) and the initial load input is the endpoint, referred to herein as a starting point, of the selected control characteristic resulting in the initial rim pull generated via a least amount of engagement of the transmission clutch(es) greater than zero. The control characteristics will be discussed in more detail in connection with FIG. 5.

Figure 4:
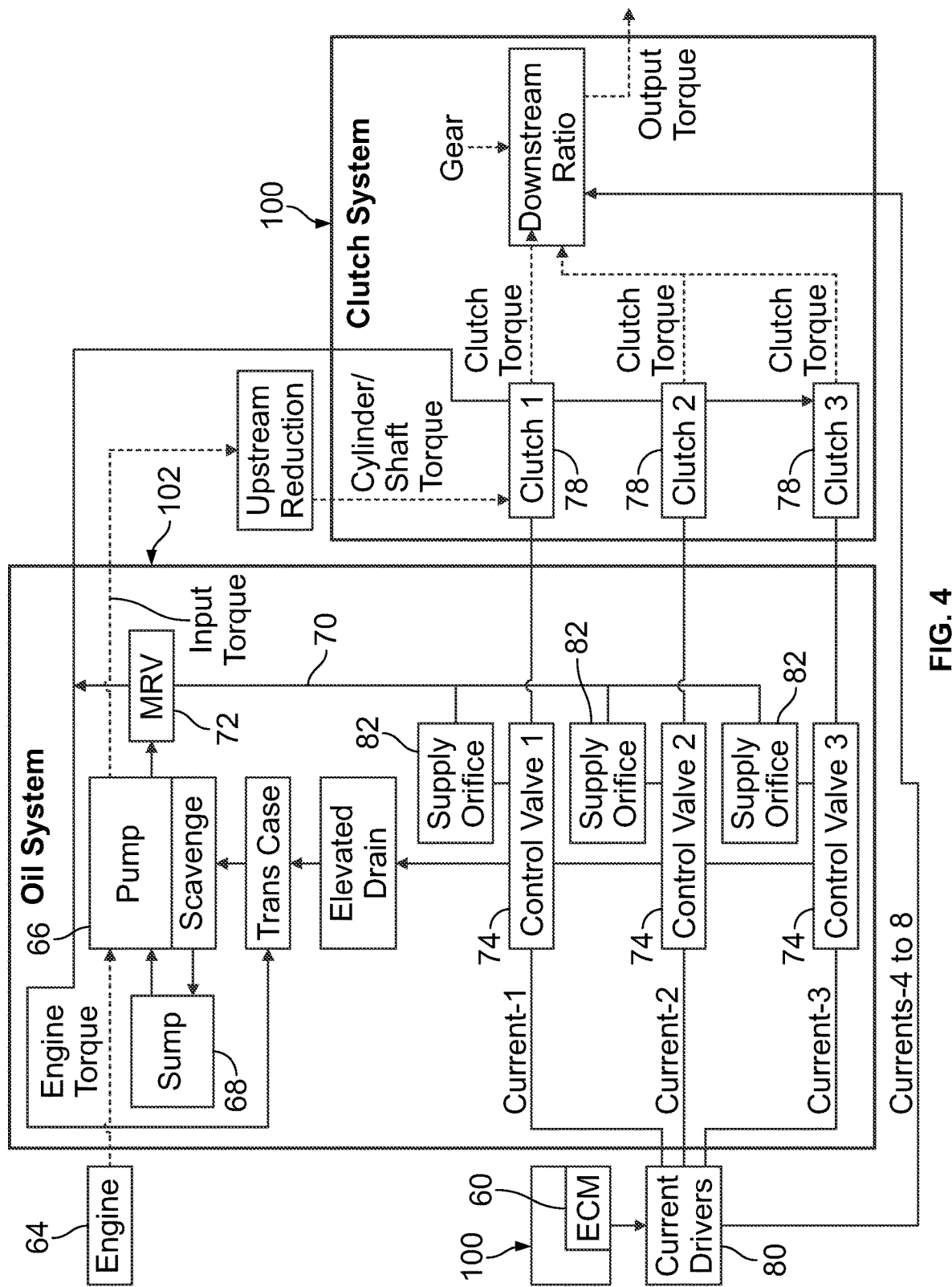
FIG. 4 is a schematic of a hydraulic system, clutch system, and power train, configured to respond to control instructions based on characteristic response polynomials generated by an electronic control module of an inching control system according to an embodiment of the disclosure.

FIG. 4 is a schematic of one embodiment illustrating a machine with a hydraulic fluid system 102 and a clutch system 104 configured to convert engine torque to output torque (rim pull) including inputs from an ECM 60 of an inching pedal control system 100. It will be understood that the illustrated hydraulic fluid and clutch systems 102, 104 being described herein are part of a commercially available machine and are being shown for context, not for purposes of limiting the disclosure, and therefore only general aspects of the machine will be set out. It will be understood that the inching pedal control system 100 being described herein may be used with a variety of machines with hydraulic (fluid pressure) clutches which can be actuated in various ways, as well as with other, non-hydraulic clutches.

Engine 64 produces torque which is used to power a pump 66 and other machine systems as is known. It is contemplated that the engine 64 may alternately include another source of power such as a fuel cell, a power storage device, an electric or hydraulic motor, and/or another source of power known in the art. It is also contemplated that the engine 64 may be operatively connected to the transmission 30 and the pump 66 by any suitable manner known in the art, such as, for example, gearing, a countershaft, and/or a belt.

The pump 66 is supplied with a suitable hydraulic fluid, i.e., oil, acquired from a fluid sump 68, which collects fluid from a variety of sources. The pump 66 generates pressurized fluid which may be directed to a common rail 70 through a mechanical pressure valve 72 (MRV). The common rail 70 supplies fluid to a plurality of control valves 74 through supply orifices 82.

The control valves 74 are in communication with clutches 78 of the clutch system 104 and permit fluid to flow from the common rail 70 to the clutches responsive to electrical current generated by current drivers 80, wherein the current generated by the current drivers operating the control valves is proportional to the output commands generated by the inching pedal control system 100. In one embodiment, there are three control valves 74, operably responsive to the current drivers 80, each of the control valves being supplied pressurized fluid through the supply orifices 82 and directing pressurized fluid to a different one of three clutches 78. It will be understood that alternative embodiments may use different numbers of clutches with commensurate adaptations in the number of related elements of the fluid system 102. The final output torque that creates rim pull is a function of the clutch reaction torque multiplied by the transmission reduction.

Figure 5:
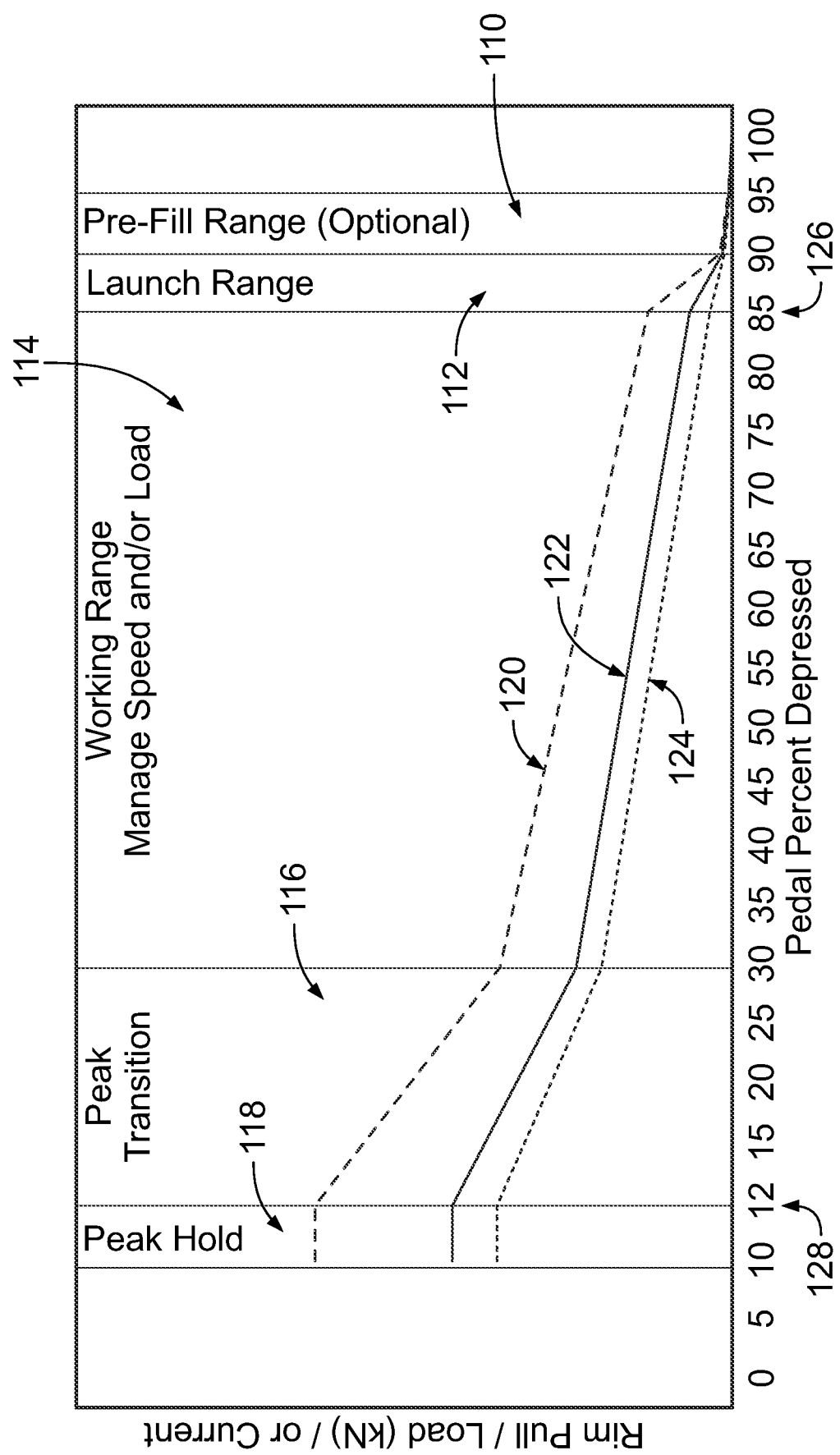
FIG. 5 is a graph of several alternative characteristic response polynomials or control curves, which an electronic control module of an inching control system may employ according to an embodiment of the disclosure.

Exemplary control command outputs of the ECM 60 are represented in the graph illustrated in FIG. 5. In the graph, and also referring to the preceding figures, the X-axis represents as a percentage the amount by which the inching pedal 54 is depressed. The Y-axis represents the output command in terms of any of signal gain, current generated by the current drivers, the load (kN), or rim pull.

The graph shows five operating ranges 110, 112, 114, 116, 118, which are shown for context, as a function of the inching pedal position. It will be understood that some embodiments may omit one or more of the ranges and some systems may benefit by dividing up the operating ranges of the inching system into more ranges than those shown. In addition, three polynomial control curves 120, 122, 124 are shown that represent high, medium, and low inching control characteristics. The shapes of the polynomial control curves are similar, but different in extent (gain) and slope. It will readily apparent that combinations of the three peak torque inputs 57 and the three initial load inputs 59 would yield nine different inching control characteristics curves. For clarity only three such curves are shown. In addition, alternative embodiments may include more or fewer control curves by subtracting or adding variables to generate different control characteristics.

When the inching pedal is 100% depressed, no command is generated, the clutches are all in a state of disengagement, and minimal torque from the engine is sent through the transmission to the wheel rims. As the inching pedal 54 is released from a fully depressed state, the ECM 60 may generate a command that causes prefill of at least one of the control valves. This prefill stage 110 may occur when the inching pedal is positioned in a range, for example, between 100% and 90% depressed. The next stage, the launch stage 112, may occur in a range where the inching pedal is positioned between 90% and 85% depressed. In the launch stage 112, the one or more clutches begin to transmit torque but may slip a significant amount. Some torque is transmitted to the transmission. Depending on the material being worked, engine speed, and the selected gear, for example, the machine 10 may begin to launch.

The working range 114 where some slippage of the clutch(es) is desired by the operator may occur in a range between about 85% to about 30% depressed. A peak transition range 116, where the operation of the clutches transition from some slippage to fully engaged may occur in a range between about 30% and 12%, for example. A peak hold range 118 may occur in a range between about 12% and 0% depressed. In the peak hold range, the ECM may be programmed to automatically fully engage the clutch(es) according to a predetermined control sequence that takes into account engine speed and the selected gear and ignores a condition where the inching pedal is slightly depressed, for example, from 0% to about 10%, such as when an operator rests their foot on the pedal and inadvertently leaves the pedal slightly depressed without intending to cause clutch slippage. The specific examples of percentages of these disclosed stages provided herein are one embodiment of the disclosure and it will be understood that any changes in the percentages and stages do not fall outside the scope of the disclosure.

The polynomial control curves 120, 122, 124 may be respectively referred to as high 120, medium 122, and low 124 control curves. The three illustrated control curves differ in starting points and endpoints, and because they have different starting and end points have different slopes at least in some of the curve segments. The operator, with the selector 56, selects the starting points and endpoints of the desired active part of a curve, which defines the slope of the curve defined by the endpoints, which in turn determines the amount of gain generated by the ECM 60 as a function of the pedal position.

For example, the polynomial control curve indicated at 120 has an endpoint 126, which will be referred herein as a starting point, selected by selector 59 that corresponds to the "high" setting, at an inching pedal depression position of 85%, which generates a greater gain than the middle setting (corresponding to the curve 122), which itself generates greater gain than the low setting (corresponding to the curve 124) at the same pedal position. In this example, the gain generated at an inching pedal depression position of 85% generates a gain that corresponds to a relatively greater command current and a correspondingly greater clutch engagement amount and torque transfer. The endpoint 128 of the curve 120 that corresponds to an inching pedal position of 12%, generates a greater gain than the middle setting (corresponding to the curve 122), which itself generates greater gain than the low setting (corresponding to the curve 124) at the same pedal position. In this example, endpoint 128, the gain generated at an inching pedal depression position of 12% generates a gain that corresponds to a relatively greater command current and a correspondingly greater clutch engagement amount and torque transfer. Because the slope of the curve 120 is steeper than the middle and low curves 122, 124, the curve 120 may be considered more aggressive since there is a greater rate of engagement of the clutch(es) and torque transfer for a given change of position of the inching pedal. In addition, there is a greater amount of load and therefore, rim pull, generated by the curve 120 relative to the middle and low curves 122, 124, and this could be preferred by an operator working on a difficult or heavy material, for example. In contrast, where less aggressive response to changes in pedal position would be desired, the operator may select one of the middle or low curves 122, 124. As noted above, the polynomial control curves generated by the ECM 60 responsive to operator selections and inching pedal positions, may be any desirable shape, including linear, variable slope, segmented, stepped, and progressive, or others.

The operator, by inputting selections determines selectable characteristics of a control curve. As noted above, the selected starting point 126 and endpoint 128 can determine the gain at that point of the curve that is being generated by the ECM 60 and therefore the overall slope or slopes of the control curve. For example, if a starting point 126 is selected as "low" and an endpoint 128 is selected as "low" the ECM 60 generates control curve 124.

In the illustrated embodiment, the starting point 126 is located at 85% pedal depression and the endpoint 128 is located at 12% pedal depression. In an additional embodiment, the starting point 126 and the endpoint 128 of the curves may be altered according to operator preferences by changing at what percentage of pedal depression position the starting point 126 and the endpoint 128 is generated by the ECM 60.

Figure 6:
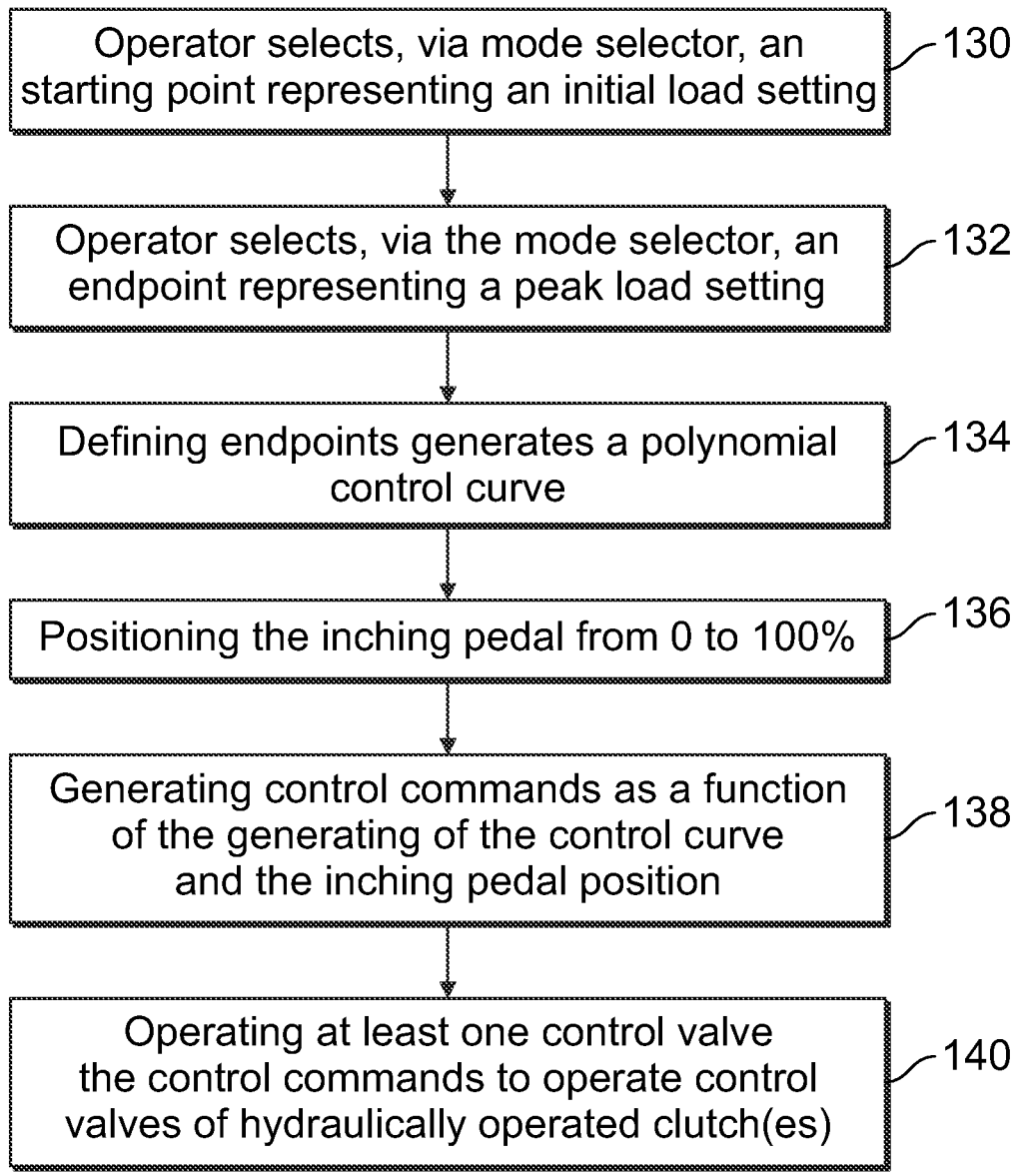
FIG. 6 is a flowchart of an embodiment of operating a machine with a selectable inching control.

FIG. 6 shows an embodiment of a method of operating a machine with an inching pedal using selectable control parameters. In step 130, while the machine is operative, the operator selects, via the mode selector 56, an endpoint, referred to herein as a starting point, representing an initial load setting. In the present example detailed above, the selection is one of High, Medium, or Low. In step 132, the operator selects, via the mode selector 56, an endpoint representing a peak load endpoint representing the maximum load at peak. As a result, a polynomial control curve is enabled or generated by the ECM 60 at step 134 with a defined gain as a function of inching pedal position (other control curves could also be enabled or generated). The operator positions the inching pedal from 0 to 100% in step 136. The ECM 60, in step 138 generates control commands as a function of the selected mode and the inching pedal position. In step 140, at least one current driver, responsive to the control commands generated by the ECM 60, operates at least one of the control valves 74 to supply pressurized fluid to at least one of the clutches 78 of the machine clutch system 104.

INDUSTRIAL APPLICABILITY

The industrial applicability of the system described herein will be readily appreciated from the forgoing discussion. The foregoing discussion is applicable to machines that may be operated with an inching control including loaders, graders, earth moving machines, farming machinery, and other machines where selectable inching control parameters would enhance the effectiveness of operation of the machine. In yet other examples, the present disclosure may be applied to operations that require movement of a machine over an area in order to produce a specified condition of the area in a specified and/or efficient manner.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A method of operating a machine with at least one hydraulically actuated friction clutch, comprising:
   selecting, via a mode selector, a starting point defining an initial torque value from a plurality of initial torque values that correspond to an initial engagement of the clutch;
   selecting, via the mode selector, an endpoint defining a peak torque value from among a plurality of preset peak torque values that correspond to full engagement of the clutch;
   employing a control curve based on at least said selecting of the starting point and said selecting of the endpoint wherein the control curve includes the initial torque value and the peak torque value;
   positioning an inching pedal of the machine to between 0 percent depressed and 100 percent depressed;
   generating at least one control command as a function of said control curve and said positioning of the inching pedal; and
   operating at least one control valve of said at least one hydraulically actuated friction clutch according to the at least one control command.

2. The method of claim 1 wherein the starting point corresponds to an initiation of a working range of the control curve.

3. The method of claim 2 wherein the endpoint corresponds to a peak hold value of the control curve.

4. The method of claim 1 wherein the initial setting corresponds to a first selected position of the inching pedal.

5. The method of claim 4 wherein the peak setting corresponds to a second selected position of the inching pedal.

6. The method of claim 5 wherein said first selected position is a depressed percentage that is greater than said second selected position.

7. The method of claim 1 wherein the control curve is linear or comprised of plural linear segments.

8. The method of claim 7 wherein the control curve represents gain, current, or load.

9. The method of claim 1 wherein the control curve is a polynomial curve.

10. The method of claim 1 wherein the mode selector includes three selectable settings for the starting point and three selectable settings for the endpoint.

11. A machine, comprising:
    a frame;
    a power source mounted to said frame;
    a transmission coupled to said power source, said transmission comprising at least one hydraulically actuated friction clutch; and
    an inching control system comprising:
      a variable position inching pedal disposed on said frame;
      a sensor configured to sense the position of said inching pedal and generate a position signal corresponding to the variable position of said inching pedal;
      a mode selector mounted on said frame; and
      an electronic control module configured to receive the position signal from said sensor and inputs from said mode selector and configured to employ at least one control curve based on the inputs from said mode selector, wherein the inputs from the mode selector set a starting point defining an initial torque value from a plurality of initial torque values that correspond to an initial engagement of a clutch and an endpoint defining a peak torque value from a plurality of peak torque values that correspond to full engagement of the clutch;
    wherein the electronic control module is configured to generate control commands based on the position signal of said sensor and the generated control curve and configured to control said at least one hydraulically actuated friction clutch of said transmission via the control commands.

12. The machine of claim 11 wherein the starting point corresponds to an initiation of a working range of the control curve.

13. The machine of claim 12 wherein the endpoint corresponds to a peak hold value of the control curve.

14. The machine of claim 10 wherein the initial setting corresponds to a first selected position of the inching pedal.

15. The machine of claim 14 wherein the peak setting corresponds to a second selected position of the inching pedal.

16. The machine of claim 15 wherein said first selected position is a depressed percentage that is greater than said second selected position.

17. The machine of claim 10 wherein the control curves are linear or comprised of plural linear segments.

18. The machine of claim 10 wherein the control curves are polynomial curves.

* * * * *